(12) United States Patent
Garmon et al.

(10) Patent No.: US 8,996,548 B2
(45) Date of Patent: Mar. 31, 2015

(54) IDENTIFYING CONSUMING ENTITY BEHAVIOR ACROSS DOMAINS

(75) Inventors: Ronnie J. Garmon, Marietta, GA (US); Jim J. Deffenbaugh, Atlanta, GA (US)

(73) Assignee: Inmar Analytics, Inc., Winston-Salem, NC (US)

( * ) Notice: Subject to any disclaimer, the term of this patent is extended or adjusted under 35 U.S.C. 154(b) by 355 days.

(21) Appl. No.: 13/009,666

(22) Filed: Jan. 19, 2011

(65) Prior Publication Data
US 2012/0185494 A1    Jul. 19, 2012

(51) Int. Cl.
G06F 17/30    (2006.01)
G06Q 30/02    (2012.01)

(52) U.S. Cl.
CPC .......... G06Q 30/02 (2013.01); G06F 17/30864 (2013.01)
USPC .......................................... 707/758; 705/14.3

(58) Field of Classification Search
None
See application file for complete search history.

(56) References Cited

U.S. PATENT DOCUMENTS

| | | | |
|---|---|---|---|
| 4,853,882 A | 8/1989 | Marshall | |
| 5,111,395 A | 5/1992 | Smith et al. | |
| 5,680,611 A | 10/1997 | Rail et al. | |
| 5,724,597 A | 3/1998 | Cuthbertson et al. | |
| 5,799,302 A | 8/1998 | Johnson et al. | |
| 5,819,291 A | 10/1998 | Haimowitz et al. | |
| 6,070,169 A * | 5/2000 | Shorter | 1/1 |
| 6,073,140 A | 6/2000 | Morgan et al. | |
| 6,523,041 B1 | 2/2003 | Morgan et al. | |
| 6,766,327 B2 | 7/2004 | Morgan, Jr. et al. | |
| 6,961,721 B2 | 11/2005 | Chaudhuri et al. | |
| 6,985,296 B2 | 1/2006 | Lipton et al. | |
| 7,035,855 B1 * | 4/2006 | Kilger et al. | 707/703 |
| 7,158,943 B2 * | 1/2007 | van der Riet | 705/14.41 |
| 7,231,380 B1 * | 6/2007 | Pienkos | 1/1 |
| 7,287,019 B2 | 10/2007 | Kapoor et al. | |
| 7,370,044 B2 | 5/2008 | Mulhern et al. | |
| 7,647,344 B2 | 1/2010 | Skurtovich, Jr. et al. | |
| 7,725,421 B1 | 5/2010 | Gedalius et al. | |
| 7,962,493 B2 * | 6/2011 | Ungureanasu et al. | 707/754 |
| 7,984,068 B2 * | 7/2011 | Ranjan et al. | 707/784 |
| 8,521,758 B2 * | 8/2013 | Nachnani et al. | 707/758 |
| 8,572,191 B2 * | 10/2013 | Bonforte | 709/206 |
| 8,635,237 B2 * | 1/2014 | Bansal et al. | 707/758 |
| 8,713,434 B2 * | 4/2014 | Ford et al. | 715/700 |
| 8,793,314 B2 * | 7/2014 | Spivak et al. | 709/204 |
| 8,826,407 B2 * | 9/2014 | Henderson | 726/8 |
| 2002/0038312 A1 | 3/2002 | Donner | |
| 2003/0126146 A1 * | 7/2003 | Van Der Riet | 707/100 |
| 2004/0243539 A1 * | 12/2004 | Skurtovich et al. | 707/1 |
| 2004/0243549 A1 | 12/2004 | Richartz et al. | |
| 2005/0004820 A1 * | 1/2005 | LeMieux | 705/5 |

(Continued)

*Primary Examiner* — Richard Bowen
(74) *Attorney, Agent, or Firm* — Allen, Dyer, Doppelt, Milbrath & Gilchrist, P.A.

(57) ABSTRACT

The present disclosure relates to identifying consuming entity behavior across domains. Identity records are stored in a memory accessible to a computing system. Each of the identity records comprises at least one attribute, and the identity records originate from a plurality of domains. A determination is made as to whether a first one of the identity records identifies a consumption entity that is identified by a second one of the identity records. The first and the second identity records originate from separate ones of the domains, and the second one of the identity records is associated with a persistent key. The persistent key is associated with the consumption entity. The first identity record is associated with the persistent key if the first identity record is determined to identify the consumption entity.

16 Claims, 5 Drawing Sheets

(56) References Cited

U.S. PATENT DOCUMENTS

| | | | |
|---|---|---|---|
| 2005/0164704 A1* | 7/2005 | Winsor | 455/432.3 |
| 2006/0089948 A1* | 4/2006 | Picker et al. | 707/103 R |
| 2006/0149674 A1* | 7/2006 | Cook et al. | 705/44 |
| 2007/0219866 A1* | 9/2007 | Wolf et al. | 705/14 |
| 2007/0251988 A1* | 11/2007 | Ahsan et al. | 235/375 |
| 2007/0260521 A1* | 11/2007 | Van Der Riet | 705/14 |
| 2008/0059523 A1* | 3/2008 | Schmidt et al. | 707/104.1 |
| 2008/0316925 A1* | 12/2008 | Dolin et al. | 370/232 |
| 2009/0287536 A1* | 11/2009 | Sheng | 705/10 |
| 2010/0005078 A1* | 1/2010 | Bayliss | 707/4 |
| 2010/0205193 A1* | 8/2010 | Krishna | 707/758 |
| 2011/0099202 A1* | 4/2011 | Dedeoglu et al. | 707/780 |

\* cited by examiner

IDENTIFYING CONSUMING ENTITY BEHAVIOR ACROSS DOMAINS

STATEMENT REGARDING FEDERALLY SPONSORED RESEARCH OR DEVELOPMENT

This invention was made with Government support under grant no. 0923704 awarded by the National Science Foundation. The Government has certain rights in this invention.

BACKGROUND

The average person may frequent many different stores to purchase various items. For example, one individual may purchase clothing from several different clothing stores. Such stores may store the identity of the consumer and a record of their purchases over time in order to direct marketing efforts towards such a consumer. Unfortunately, such stores can only have the benefit of knowing the purchase habits of the consumer with respect to their outlet.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

Figure 1:
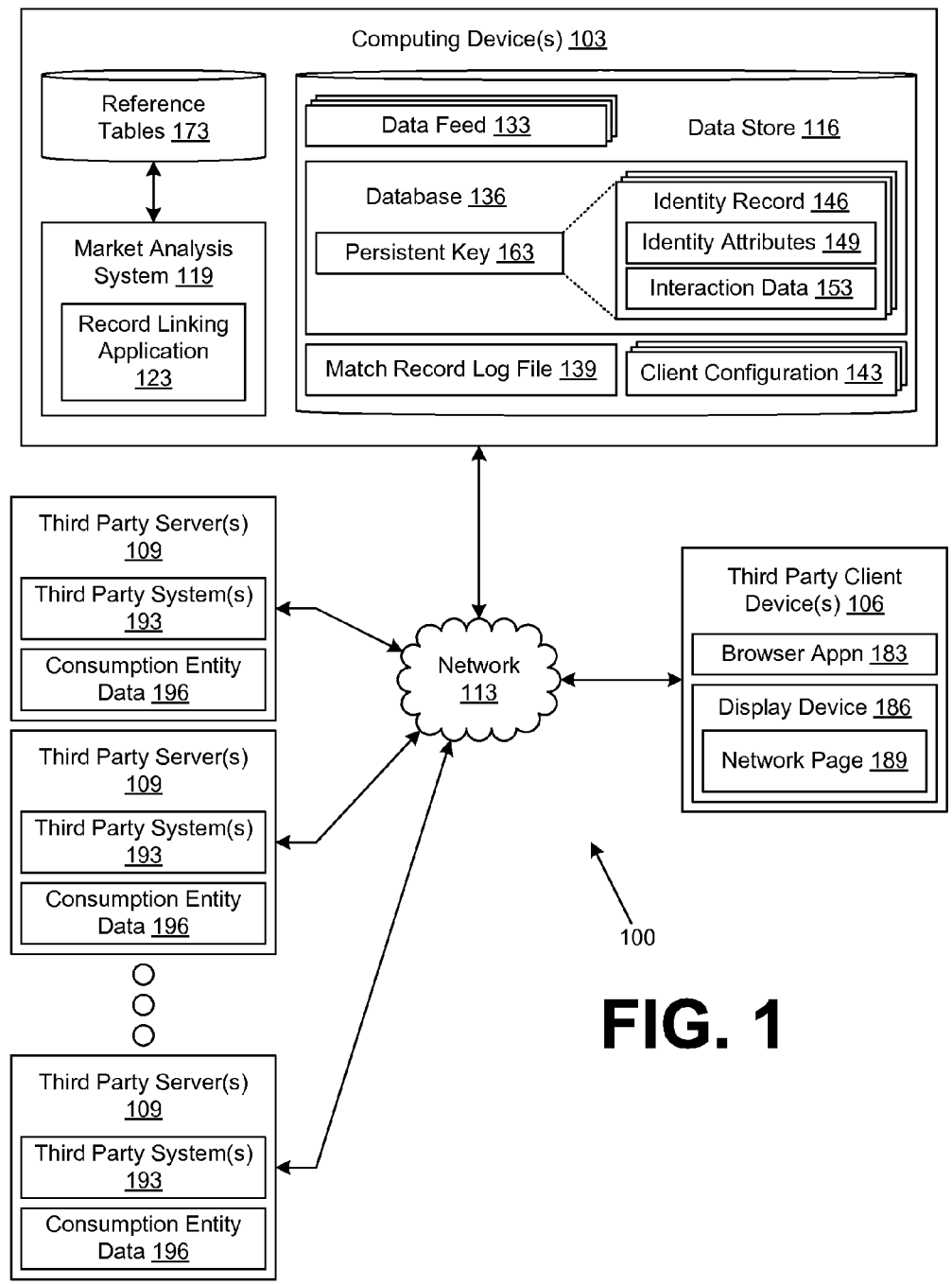
FIG. 1 is a drawing of a networked environment according to various embodiments of the present disclosure.

With reference to FIG. 1, shown is a networked environment 100 according to various embodiments. The networked environment 100 includes one or more computing devices 103, one or more third party client devices 106, one or more third party servers 109, and potentially other devices, each of which is coupled to a network 113. The network 113 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though the computing device is referred to in the singular, it is understood that a plurality of computing devices 103 may be employed in the various arrangements as described above.

Various applications and/or other functionality may be executed in the computing device 103 according to various embodiments. Also, various data is stored in a data store 116 that is accessible to the computing device 103. The data store 116 may be representative of a plurality of data stores as can be appreciated. The data stored in the data store 116, for example, is associated with the operation of the various applications and/or functional entities described below.

The components executed on the computing device 103, for example, include a market analysis system 119 and other applications, services, processes, systems, engines, or functionality not discussed in detail herein. The market analysis system 119 is executed to perform various analyses on marketing data stored in the data store 116 to predict consumer behavior for merchants. Although the term "merchant" is used herein to describe an entity that obtains information from the market analysis system 119 and potentially performs other functions, it is understood that the present discussion may relate to entities other than merchants. Consquently, a "merchant" as mentioned here is but one example of such entities, where the discussion herein is not limited to merchants.

The market analysis system 119 includes a record linking application 123 that is executed as a portion of the market analysis system 119 in order to identify multiple identity records associated with a single consumption entity as will be described. As contemplated herein, a consumption entity may comprise, for example, a single consumer, a family, a business, a governmental entity, an agency, a charity, or other grouping of individuals that engage in consuming behavior and can be considered a single entity for the purposes of marketing analysis as can be appreciated.

The data stored in the data store 116 includes, for example, data feeds 133, a database 136, a match record log file 139, data that represents a client configuration 143 used in association with the market analysis system 119, and potentially other data. Each data feed 133 includes information about consumption entities. Such data is embodied in plurality of identity records 146 that are extracted from the data feeds 133, cleansed or otherwise processed, and then stored in the database 136 as shown. In cleansing the data from the data feeds 133, various data hygiene rules may be employed to ensure that data in various fields is appropriate for respective field type, such as ensuring that a phone number field includes numbers and not letters, etc. In addition, various data inference rules, business rules, and address standardization techniques may be employed.

Such rules may comprise, for example, marking identity records 146 as inactive if there has been no activity by a corresponding consumption entity within a predefined past time period such as, for example, a month, year, or other time period. Other rules may involve characterizing various email addresses included in identity records 146 such as, for example, inferring that an email address that ends with "edu" is a college email address, or that some addresses are personal email addresses such as those with a domain such as "AOL" or "Gmail." There may be many other types of rules that may be applied as well.

Each identity record 146 includes identity attributes 149 and interaction data 153. The identity attributes 149 may comprise, for example, information about a consumption entity such as a name, address, telephone number(s), sex, age, and potentially other information. Other identity attributes 149 may comprise information such as an Internet Protocol (IP) address that may or may not be uniquely associated with a given consumption entity. Also, an identity attribute 149 may comprise a persistent cookie or other identification data. Some identity attributes 149 may be considered reliable over time as they do not change very often such as, for example, a name of an individual. Other attributes may be subject to change over time such as addresses, telephone numbers, and other such information. In some cases, an identity record 146 may indicate changes in respective identity attributes 149.

The interaction data 153 includes information that can provide insight into consumption behavior of entities. Thus, the interaction data 153 may comprise, for example, commercial data that memorializes a purchase of one or more items from a merchant that generated the respective data feed 133 that includes the respective identity record 146. Alternatively, the interaction data 153 may indicate other commercial behavior beyond purchasing items. The interaction data 153 may include browsing data, item or product recommendations and reviews by entities, blogging data, marketing campaign data (e.g. email campaign and other types of campaign data), data indicating customer interaction with call centers, social networking data, twitter feed data, and other information.

Generally, the data feeds 133 may be received from a third party server 109 periodically such as, for example, daily, weekly, or on some other periodic basis. In receiving the data feeds 133, the operator of the market analysis system 119 receives the interaction data 153 upon which marketing analysis may be performed. In one embodiment, each of the data feeds 133 originates from a domain of a respective merchant. That is to say, each data feed 133 originates from a domain that is unique with respect to other domains. Each data feed 133 potentially includes data about purchases and other commercial activity undertaken by consumption entities with respect to a given merchant. As a consequence, the identity of a particular consumption entity may be expressed differently with varying sets of identity attributes 149 for each merchant and potentially different values for each of those identity attributes 149 as will be described. Consequently, the data feeds 133 may include cross-domain information for respective consumption entities.

Associated with various ones of the identity records 146 is a persistent key 163. Each persistent key 163 is associated with a corresponding consumption entity. According to various embodiments, a determination is made as to whether each newly received identity record 146 from a data feed 133 reflects the commercial activity of a respective consumption entity. If so, then the information contained in the identity record 146 is associated with the consumption entity by drawing an association in the data store 116 between the identity record 146 and the persistent key 163 of the respective consumption entity. Thus, the persistent key 163 acts as a mechanism to associate identity records 146 from multiple domains with a given consumption entity.

In addition, various reference tables 173 are generated to facilitate comparisons between various pairs of identity records 146 as will be described. To this end, the various reference tables 173 may be generated from the identity records 146 of the data feeds 133 and/or other sources.

The third party client device 106 is representative of a plurality of client devices that may be coupled to the network 113. The third party client device 106 may comprise, for example, a processor-based system such as a computer system. Such a computer system may be embodied in the form of a desktop computer, a laptop computer, a personal digital assistant, a cellular telephone, set-top box, music players, web pads, tablet computer systems, game consoles, or other devices with like capability.

The third party client device 106 may be configured to execute various applications such as a browser application 183 and/or other applications. The browser application 183 may be executed in a third party client device 106, for example, to access and render network pages 189, such as web pages, or other network content on the display device 186, where the network pages 189 are served up by the computing device 103 and/or other servers. The third party client device 106 may be configured to execute applications beyond the browser application 183 such as, for example, email applications, instant message applications, and/or other applications.

Each of the third party servers 109 comprise computing systems that generate the data feeds 133 that are transmitted to the computing device 103 through the network 113. Each third party server 109 may represent a plurality of servers such as may be the case when servers are run in banks, etc. The third party servers 109 may be operated, for example, by merchants who sell items to customers or interact with individuals in some other context. Alternatively, the third party servers 109 may be operated by an entity that maintains a blog, social networking site, or other resource. A third party system 193 is implemented in each third party server 109.

Each third party system 193 may be employed, for example, to facilitate the sale of goods and services through various channels. For example, a given third party system 193 may comprise an electronic commerce system that facilitates the sale of items over a network 113. Alternatively, the third party system 193 may comprise the information technology that comprises the infrastructure backend of a brick and mortar merchant, or some other commercial presence.

In any event, each third party system 193 generates consumption entity data 196. The consumption entity data 196 includes identity information about customers, information about payment instruments, purchase history information, preferences, hobbies, and other information. The purchase history information includes a record of the past purchase of a given customer and may provide insight as to the purchasing habit of the customer. The data included in each data feed 133 is generated from the consumption entity data 196 of a respective merchant.

As an additional alternative, a third party system 193 may facilitate other types of interaction with consumption entities beyond facilitating the purchase of goods and services. For example, the third party system 193 may facilitate the publication of a blog, reviews, recommendations, and other information. Still further, the third party system 193 may facilitate a social networking site. It follows that other entities beyond merchants may generate the consumption entity data 196, where merchants are cited as one example as mentioned above. Regardless of the function, each third party system 193 generates consumption entity data 196 that is sent to the computing device 103 as a data feed 133.

Next, a general description of the operation of the various components of the networked environment 100 is provided. To begin, various different merchants in a given product segment or industry may compete against each other to sell their merchandise. The merchants operate the various third party systems 193 in the normal course of business and ultimately generate consumption entity data 196 based on the purchases made by their customers or based on other interaction with consumption entities. Periodically, the consumption entity data 196 is provided to the operator of the computing device 103 in the form of the data feeds 133. The operator of the computing device 103 may then aggregate the consumption entity data 196 from each merchant in order to provide market analysis to each of the contributing merchants. In one embodiment, the merchants who contribute consumption entity data 196 are given access to market analysis that is commensurate with the information that they provide.

In order to aggregate the consumption entity data 196 from each merchant, the market analysis system 109 includes the record linking application 123 that is configured to associate identity records 146 from the data feeds 133 of multiple merchants with common consumption entities. That is to say, that a given consuming entity such as an individual may make purchases from multiple merchants. Thus, the consumption entity data 196 from multiple merchants in the same industry segment is likely to include information about purchases and the identity of the same consumption entity. For example, individuals are likely to purchase clothing from several merchants in the clothing industry.

Unfortunately, it is often the case that the identity of a given consumption entity can vary from merchant to merchant. For example, an individual formally named "Ronald J. Garmon" may be referred to in several different ways such as "R. J. Garmon," "Ronald Jack Garmon," "Ron Garmon," "Ronnie Garmon," and so on. Also, such an individual may have multiple addresses, or their address may be expressed in any one of several ways. For example, Ronald Garmon may live on "123 Main Street," "123 Main St.," or "123 Main." In some cases, their identity information may be expressed incorrectly such as "124 Main Avenue," etc.

Accordingly, the record linking application 123 is configured to process the identity records 146 from the data feeds 133 to associate such identity records 146 with consumption entities. In order to associate multiple identity records 146 with a given consumption entity, a persistent key 163 is generated for each consumption entity.

In some cases, one or more identity records 146 may already have been associated with a given persistent key 163. The record linking application 123 is configured to identify newly received identity records 146 that were generated by the same consumption entity as those identity records 146 that were previously associated with a persistent key 163. This may be done, for example, by comparing the identity attributes 149 of the newly received identity records 146 with the identity attributes 149 of identity records 146 that were previously associated with the persistent key 163 representing the respective consumption entity. As will be described in greater detail below, the record linking application 123 is configured to identify a match between the identity attributes 149 of various identity records 146, thereby determining whether such identity records 146 originate from the same consumption entity. In order to determine whether such a match exists, a score is generated for a possible match that is used to determine whether an actual match exists between respective identity records 146.

If a new identity record 146 is deemed to match an identity record 146 that is associated with a given persistent key 163, then the new identity record 146 is also associated with the same persistent key 163. This is because the match indicates that the new identity record 146 was generated by the same consumption entity for which the persistent key 163 was generated. Thus, any identity record 146 associated with a persistent key 163 may be compared with a newly received identity record 146 to determine whether the newly received identity record 146 was generated by the respective consumption entity.

If a new identity record 146 is deemed to match a second identity record 146 that is not associated with a given persistent key 163, then the new identity record 146 and the second identity record 146 may be deemed to have been generated by the same consumptive entity. In such case, the record linking application 123 is configured to issue a new persistent key 163, and both identity records 146 are associated therewith. This is because the match between the respective identity records 146 indicates that they potentially originate from the commercial behavior of the same consumption entity. In such case, both of the identity records 146 may have been newly received, or the second identity record 146 did not previously match with any other identity record 146.

Thus, persistent keys 163 are issued when a match is identified between identity records 146 that were not previously associated with a persistent key 163. Over time, identity records 146 that are not associated with a persistent key 163 may eventually be so associated when other identity records 146 of the same individual are received in various data feeds 133.

The detailed process of identifying when a given identity record 146 emanates from the same consumption entity as a second identity record 146 will be described in greater detail below. Ultimately, by associating all identity records 146 generated across multiple domains with respective consumption entities, more detailed marketing analysis may be performed and the results surfaced to the various merchants who participate.

Figure 2:
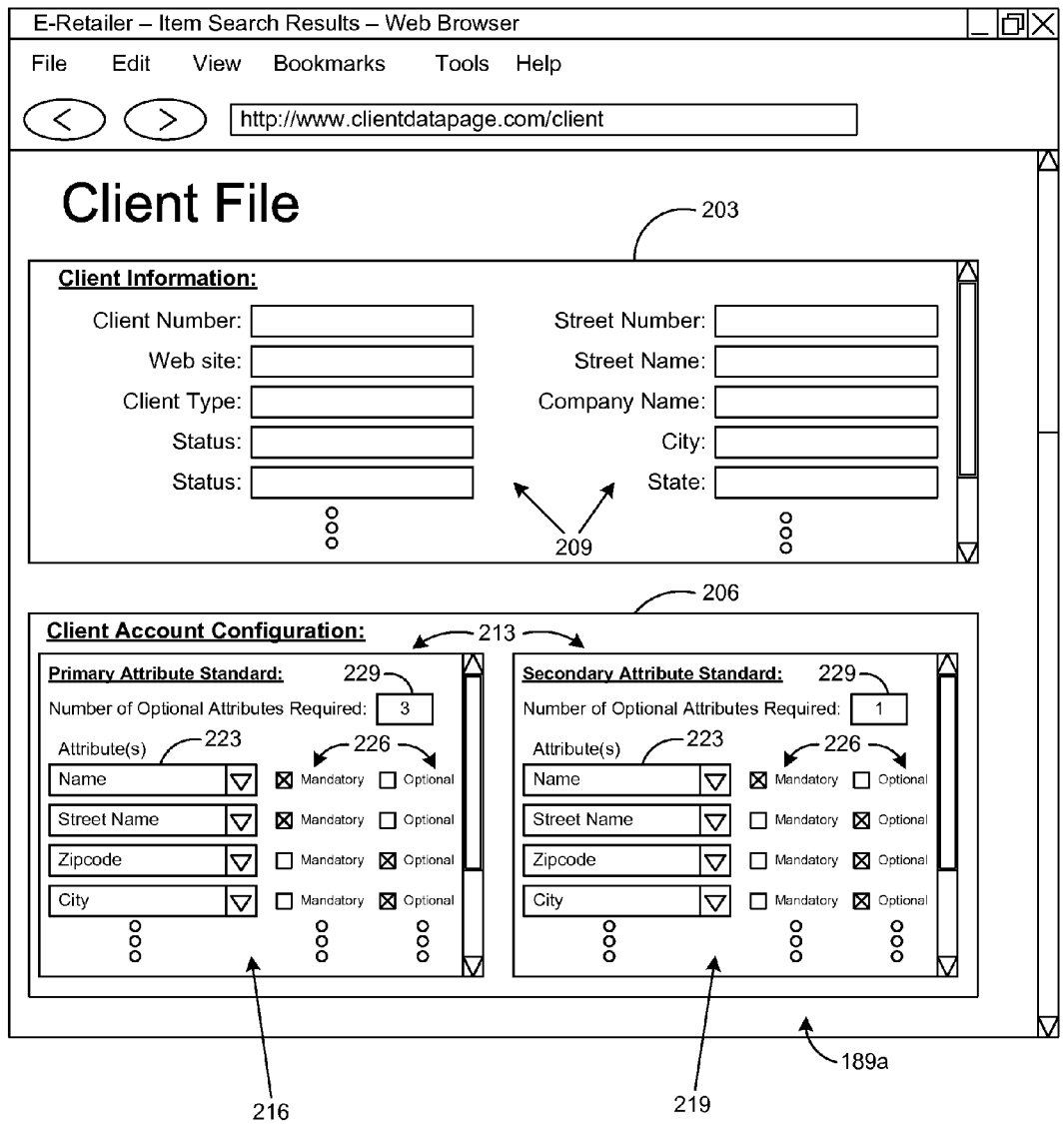
FIG. 2 is a drawing of an example of a network page rendered by a client in the networked environment of FIG. 1 according to various embodiments of the present disclosure.

Turning next to FIG. 2, shown is one example of a network page 189, denoted herein as network page 189a, that provides an input portal for an operator of the market analysis system 119 (FIG. 1), or a merchant who participates in the operation of the market analysis system 119 (FIG. 1), to specify their client configuration and to perform other tasks.

The network page 189a includes a merchant information form box 203 and a merchant account configuration box 206. The merchant information form box 203 includes a number of input fields 209 that facilitate entry of pertinent information about a given merchant who participates in the analysis provided by the market analysis system 119 as described above. It should be noted that the fields 209 shown are merely examples of the various types of fields that may be depicted as can be appreciated.

The merchant account configuration box 206 includes attribute standard boxes 213. Each attribute standard box 213 includes a specification of a number of different attributes that must be present in order for a given identity record 146 (FIG. 1) to be considered for the matching process as mentioned above. The attribute standard boxes 213 specify a primary attribute standard 216 and a secondary attribute standard 219. Although two attributes standards 213/216 are shown, it is understood that there may be any number of attribute standards that are applied in predefined situations as specified by the record linking application 123 as described above.

Both the primary attribute standard 216 and the secondary attribute standard 219 include attribute fields 223. Associated with each attribute field 223 are mandatory/optional toggles 226. For each attribute 223, a mandatory or optional toggle setting is specified. If an attribute field 223 is specified as mandatory, then it must be the case that for a given identity record 146 to be considered for the matching process, the respective attribute must be present in the identity record 146. On the other hand, if the mandatory/optional toggle 226 is specified as "optional" for a given attribute field 223, then it is optional whether the respective attribute needs to be part of the respective identity record 146 for it to be considered.

Each attribute standard 216/219 also includes an optional total 229. The optional total specifies the number of optional attribute fields 223 that must exist within a given identity record 146 for it to be considered for matching as described above. In one embodiment, the primary attribute standard 216 is more stringent than the secondary attribute standard 219, although it may be the case that the respective attribute standards 216 simply differ from each other for some other predefined reason.

The number of optional attributes specified in a given primary or secondary attribute standard 216/219 may be much greater than the optional total 229 specified for the respective attribute standard 216/219. As a consequence, multiple different combinations of optional attributes may exist within a given identity record 146 to make up the optional attribute total 229 when the optional total 229 is specified as greater than 1. By specifying a number of mandatory and optional attributes in a given attribute standard 216/219, the record linking application 123 (FIG. 1) can ensure that identity records 146 are properly associated with persistent keys 163 (FIG. 1) of the corresponding consumption entities from which such identity records 146 emanate.

Figure 3A:
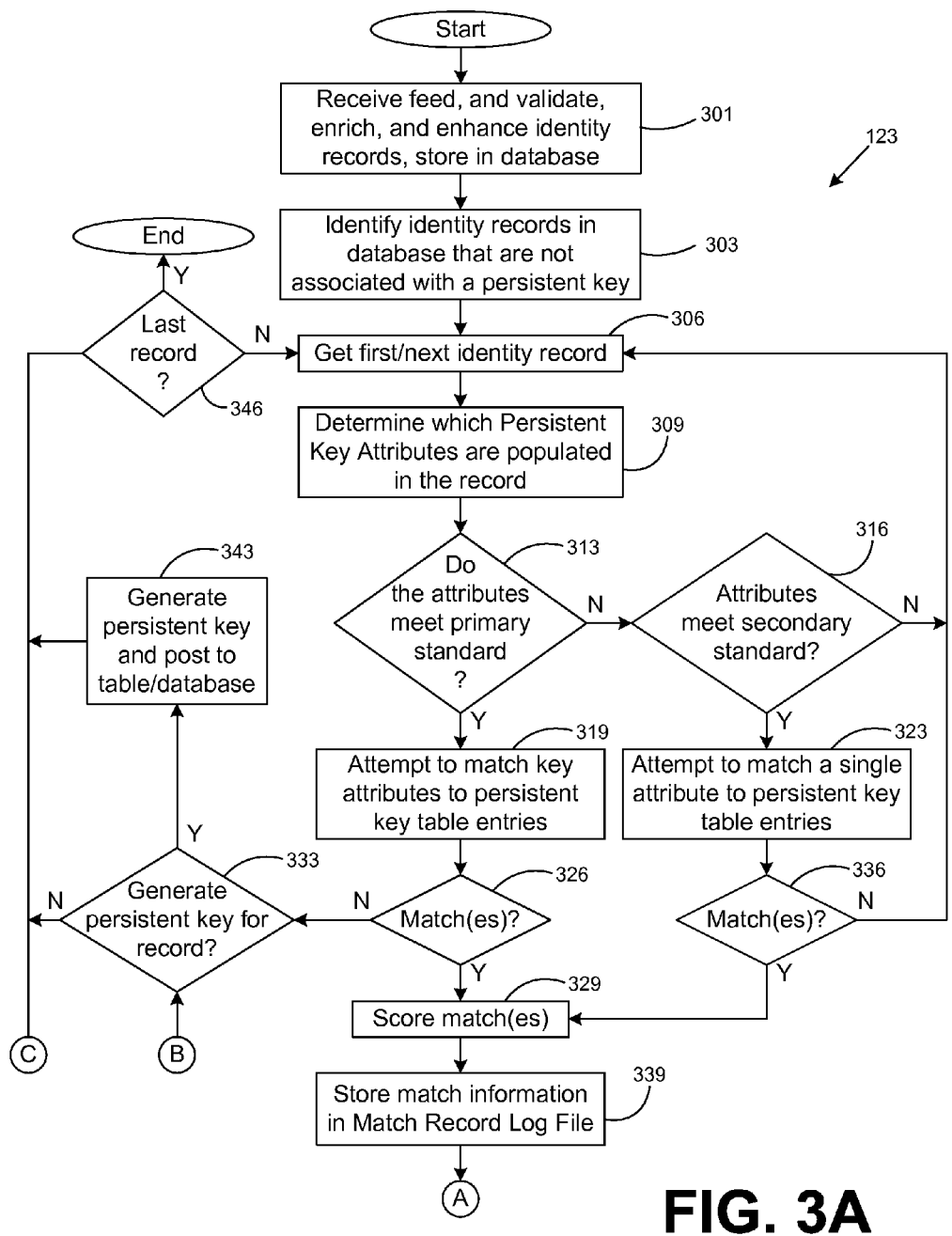
FIGS. 3A and 3B present a flowchart illustrating one example of functionality implemented as portions of a record linking application executed in a computing device in the networked environment of FIG. 1 according to various embodiments of the present disclosure.
Figure 3B:
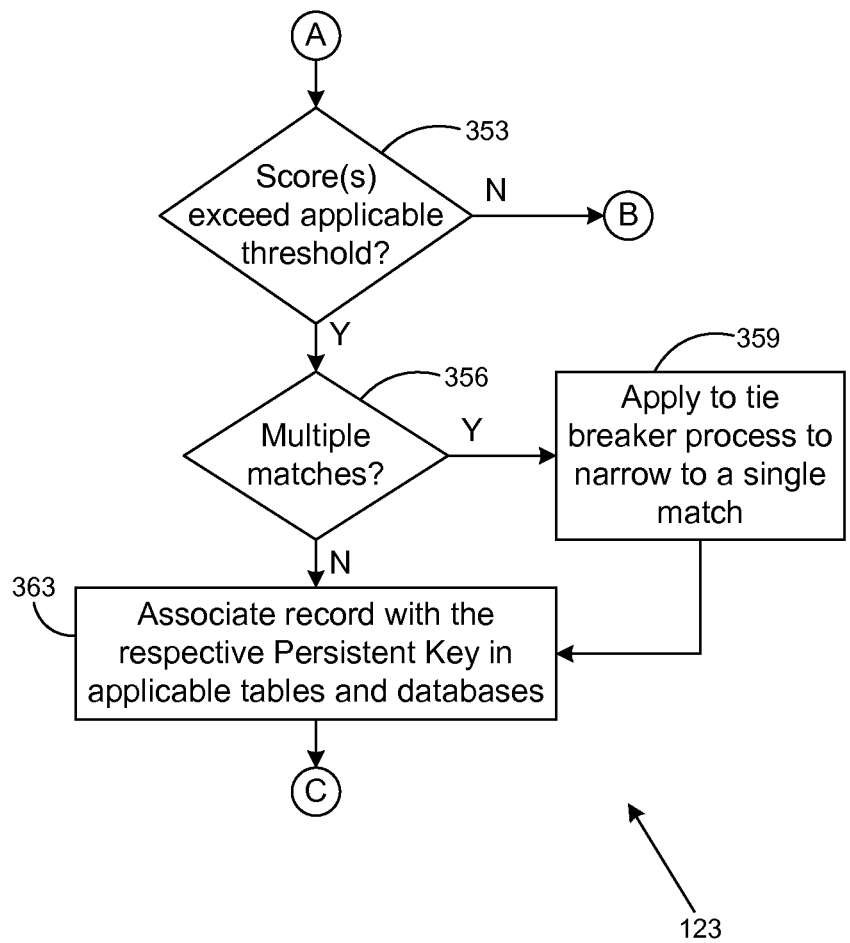

Referring next to both FIGS. 3A and 3B, shown is a single flowchart that spans across FIGS. 3A and 3B, the flowchart providing one example of the operation of a portion of the record linking application 123 according to various embodiments. It is understood that the flowchart of FIGS. 3A and 3B provides merely an example of the many different types of functional arrangements that may be employed to implement the operation of the portion of the record linking application 123 as described herein. As an alternative, the flowchart of FIGS. 3A and 3B may be viewed as depicting an example of steps of a method implemented in the computing device 103 (FIG. 1) according to one or more embodiments. The functionality represented in FIGS. 3A and 3B is implemented with respect to each data feed 133 (FIG. 1) when they are received from a merchant and potentially at other times thereafter when deemed appropriate.

To begin, in box 301, the record linking application 123 receives any new data feeds 133 from various entities and performs any initial data cleansing tasks to validate, enrich, or enhance the identity records 146 (FIG. 1) and other data included therein as described above. Alternatively, this function may be performed by some other process running separately from the record linking application 123. The cleansed or otherwise processed identity records 146 are then copied to the data base 136 (FIG. 1).

Next, in box 303, the record linking application 123 identifies any identity records 146 in the database 136 that have not been assigned to or are not associated with a persistent key 163 (FIG. 1). In some cases, all of the identity records 146 from a given data feed 133 may not be associated with a persistent key 163 if the data feed 133 was newly received from a respective merchant. On the other hand, it maybe that the record linking application 123 may revisit a given identity record 146 at predefined times to attempt to associate such an identity record 146 with a persistent key 163 as the database 136 develops.

Next, in box 306, a respective identity record 146 is designated for consideration at the beginning of a loop in which all previously unconsidered identity records 146 are processed. In box 309, the identity record 146 is examined to identify or determine which identity attributes 149 (FIG. 1) are populated therein to be considered. Various possible identity attributes 149 may be considered relevant for the purposes of matching as they are employed to associate identity records 146 with respective consumption entities represented by the persistent keys 163 as described above. The identity attributes 149 that exist in a given identity record 146 are identified so as to be able to determine whether such identity attributes 149 can reasonably be matched up with corresponding identity attributes 149 of other identity records 146. This facilitates association of identity record 146 with a given consumption entity as mentioned above.

Next, in box 313, the record linking application 123 determines whether the identity attributes 149 of the current identity record 146 meet a primary attribute standard 216 (FIG. 2). Such primary attribute standard 216 may be specified as described above. Specifically, in one embodiment, all mandatory attribute fields 223 (FIG. 2) must be included in the respective identity record 146, and at least the optional total 229 (FIG. 2) of optional attribute fields 223 must be present. If such is not the case, then the record linking application 123 proceeds to box 316. Otherwise the record linking application 123 progresses to box 319.

Assuming that the primary attribute standard 216 has not been met, then in box 316, the record linking application 123 determines whether the secondary attribute standard 219 (FIG. 2) has been met by the respective identity record 146. If so, then the record linking application 123 proceeds to box 323. Otherwise, the record linking application 123 reverts back to box 306 to identify the next identity record 146 for consideration.

Note that there may be other secondary attribute standards 219 applied as well, where the single secondary attribute standard 219 applied herein is shown for purposes of illustration. Alternatively, it may be the case that no secondary attribute standard 219 exists and that there is no attempt to measure the identity record 146 against the respective secondary attribute standard 219 as can be appreciated. The determination as to how many attribute standards 216/219 are to be applied may be configurable by a given merchant who can set up a particular configuration through an appropriate portal such as the example network page 189*a* illustrated in FIG. 2.

Assuming that the record linking application 123 progresses to box 319, then an attempt is made to match the identity attributes 149 of the respective identity record 146 with corresponding identity attributes 149 of all other identity records 146 that have gone through the process of identifying the attributes in box 309. To this end, a matching table may be created that includes all non-duplicate attributes of the respective identity records 146 to facilitate such a comparison. In box 319, the record linking application 123 may attempt to find an attribute match according to a predefined attribute standard 216/219. That is to say, the attribute standard 216/219 may be used to specify mandatory attributes for which a match must be found, as well as optional attributes for which a match may or may not be necessary, depending upon whether the optional total 229 of matches has been reached. In one example, the primary attribute standard 213 (FIG. 2) may be employed. Alternatively, some other attribute standard may be applied based on a given configuration.

The attempt to match the identity attributes 149 is ultimately an attempt to match the current identity record 146 with a consumption entity. Such a consumption entity may or may not already be associated with a persistent key 163. It may be the case that no matches are found among all of the identity records 146. Such might be the case, for example, where a given identity record 146 identifies or originates from a completely new consumption entity that has never been encountered.

Thereafter, in box 326, it is determined whether one or more matches were found between the attributes of the respective identity record 146 and other identity records 146 as described above. If matches were identified, then the record linking application 123 progresses to box 329. Otherwise, the record linking application 123 moves to box 333 as shown.

Assuming that the attributes of the current identity record 146 meet the secondary standard in box 316, then in box 323, the record linking application 123 attempts to find a match between the identity attributes 149 of the identity record 146 and the identity attributes 149 of other identity records 146. In order to determine a match, an appropriate attribute standard 216/219 may be employed. In one example, the primary attribute standard 216 may be employed as was mentioned in the discussion of box 319. Alternatively, some other attribute standard may be applied based on a given configuration.

In one embodiment, an attribute standard 216/219 may be specified in which a single attribute needs to be matched. For example, an attribute standard 216/219 may be specified as having a number of optional attributes with an optional total of "1." Alternatively, an attribute standard 216/219 may be specified having a single mandatory attribute. In this situation, such matches may not be considered as reliable as a multiple attribute match since there is potentially a higher likelihood of false matches. However, in some situations, merchants may opt to attempt to perform such a single attribute match or other match according to some other lesser attribute standard 216/219 to allow for a greater number of matches, although accuracy may suffer to some extent due to false matches.

In box 336, record linking application 123 determines whether one or more matches have been identified between the current identity record 146 and other identity records 146 as described above. If no matches are found, then the record linking application 123 reverts back to box 306 to identify the next record for identity record 146 for consideration. Otherwise, the record linking application 123 progresses to box 329.

Whether it is from box 326 or box 336 as described above, once the record linking application 123 reaches box 329, it generates a score for each match identified. In this respect, different matches may be afforded differing amounts of points toward an overall score. For example, if one attribute comprises a name of an individual, then an exact match of the name might warrant more points than say, for example, a lesser match of the name. To provide a specific example, assume that an identity attribute 149 associated with an identity record 146 includes a name attribute with the name "Ronald J. Garmon". Further assume that a name attribute associated with a second identity record 146 comprises "R. J. Garmon". If such attributes were compared, then there is a partial match. Further, the initials "R. J." are consistent with "Ronald J." Thus, although an exact match between the respective name attributes described herein does not exist, a significant number of points may be awarded given the nature of the partial match. This is because it is commonly known that names can vary depending on how they are written. If the names were an exact match, (e.g. "Ronald J. Garmon" and "Ronald J Garmon"), then a greater number of points may be assigned.

According to various embodiments, a reference table 173 (FIG. 1) may be employed to assign various points for the respective different kinds of matches of various attributes that may be detected. In some cases, partial matches may exist due to an error in an attribute itself. For example, a telephone number might have one or more digits that are incorrect or other problems as can be appreciated. In any event, various scores may be assigned to the different types of matches that are detected among various attributes, and an overall score may be calculated that comprises a total of all of the numbers assigned to each attribute match.

Thereafter, in box 339, any match information is stored in the match record log file 139 (FIG. 1) in the data store 116 (FIG. 1). This is so that all of the various matches that are identified maybe examined in the future for purposes of troubleshooting or to trace the prior matches for other purposes. Thereafter, the record linking application 123 proceeds to connector A as shown.

Assuming that no matches are found in box 326, then the record linking application 123 moves to box 333 to determine whether a persistent key 163 should be generated for the current identity record 146. This may be the case, where the identity record 146 includes such extensive or complete information as to warrant its own persistent key 163, thereby effectively identifying a new consumption entity in the database 136. Such an identity record 146 may have been generated by an entirely new consumption entity never before encountered. To make the determination as to whether a persistent key 163 may be assigned, the identity record 146 may be compared against a respective attribute standard 216/219 as described above to determine whether a predefined set of attributes exists, thereby warranting the assignment of a new persistent key 163. Such an attribute standard 216/219 may specify that certain attributes be present such as name, address, telephone number, and potentially other attributes.

In one embodiment, the attribute standard applied in box 333 to determine whether a persistent key 163 is to be generated for an identity record 146 is more restrictive than the attribute standards 216/219 applied in boxes 313 and 316. An attribute standard is more restrictive if it requires that a greater number of identity attributes 149 must be present. Thus, according to one embodiment, if the attributes standards 216/219 applied in boxes 313 and 316 are not met, then the attribute standard applied in box 333 will not be met.

If a persistent key 163 is to be generated for the identity record 146, the record linking application 123 proceeds to box 343. Otherwise, the record linking application 123 proceeds to box 346. In box 343, a new persistent key 163 is generated and associated with the identity record 146 in the data store 116. In addition, the persistent key 163 may be posted to an appropriate reference table 173 for reference in identifying potential future matches. Thereafter, the record linking application 123 proceeds to box 346.

In box 346, the record linking application 123 determines whether the last identity record 146 in the database 136 has been considered. If so, then the logic of the record linking application 123 ends as shown. Otherwise, the record linking application 123 reverts back to box 306 to designate the next unassigned identity record 146 for consideration.

Assuming, however, that the record linking application 123 has proceeded to connector A, then with reference to FIG. 3B, the record linking application 123 progresses to box 353. In box 353, the record linking application 123 determines whether any of the scores determined in box 329 for corresponding matches exceed an applicable threshold. According to one embodiment, such a threshold is predefined depending upon how reliable the operator wishes the matches to be.

Specifically, if a threshold is set too low, then identity records 146 may be associated with persistent keys 163 and, correspondingly, their consumption entities, even though such identity records 146 were not actually generated by such consumption entities. Alternatively, if the threshold is set too high, then it maybe difficult to actually obtain matches at all. Thus, the threshold for the scores is predefined with these principles in mind.

Assuming that no score or any matches exceed the applicable threshold, then the record linking application 123 moves to connector B, which also reverts the record linking application 123 to box 333 above. Otherwise, the record linking application 123 progresses to box 356. In box 356, it is determined whether there are multiple matches having scores that exceeded the applicable threshold as determined in box 353. If such is the case, then the record linking application 123 proceeds to box 359 to apply a tie breaker process to narrow the multiple matches to a single match. The tie breaker process may involve simply selecting the match having the highest score. Alternatively, if two or more highest scores are very close or the same, then in one embodiment, it is deemed that the respective identity records 146 should be combined, and a single match with the combined record is assumed. In one embodiment, identity records 146 may be assumed to be associated with the same consumption entity if the match scores are within a predefined number of points of each other. In addition, there may be other approaches to resolving a tie to a single match. Once a tie between matches is resolved in box 359, the record linking application 123 then progresses to box 363.

Assuming that there was only a single match, as determined in box 356, that exceeds the score threshold in box 353, then the record linking application 123 progresses to box 363. In box 363, the respective identity record 146 is associated with the given persistent key 163 that is associated with the existing identity record 146 with which the identity attributes 149 were deemed to match. The association between the respective identity record 146 and the persistent key 163 may be noted in various tables and databases as can be appreciated. Thereafter, the record linking application 123 progresses through connector C to box 346 to determine whether the last identity record 146 in the database 136 has been considered as mentioned above.

Figure 4:
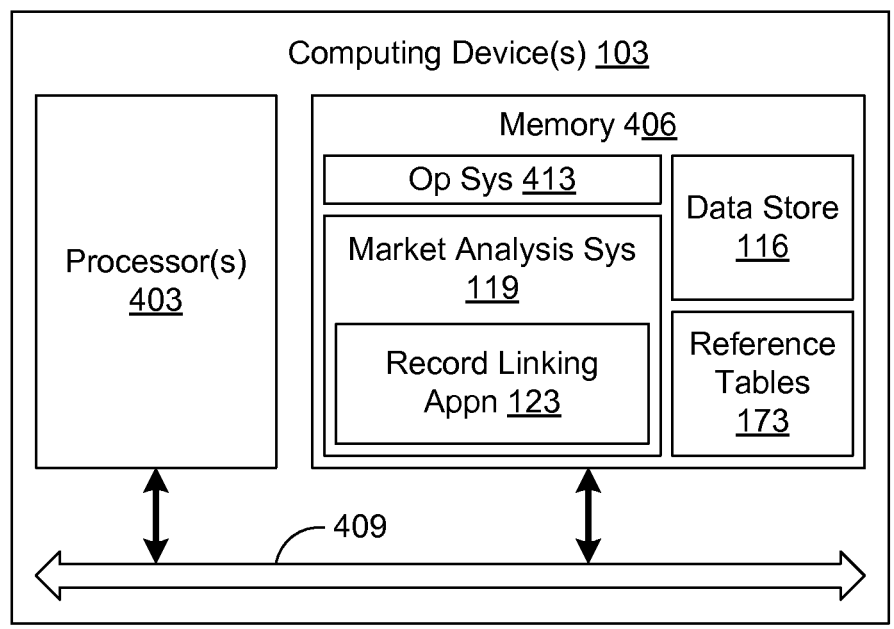
FIG. 4 is a schematic block diagram that provides one example illustration of a computing device employed in the networked environment of FIG. 1 according to various embodiments of the present disclosure.

With reference to FIG. 4, shown is a schematic block diagram of one example of the computing device 103 according to an embodiment of the present disclosure. The computing device 103 includes at least one processor circuit, for example, having a processor 403 and a memory 406, both of which are coupled to a local interface 409. To this end, the computing device 103 may comprise, for example, at least one server computer or like device. The local interface 409 may comprise, for example, a data bus with an accompanying address/control bus or other bus structure as can be appreciated.

Stored in the memory 406 are both data and several components that are executable by the processor 403. In particular, stored in the memory 406 and executable by the processor 403 are the market analysis system 119 that includes the record linking application 123, and potentially other systems and applications. Also stored in the memory 406 may be the data store 116, reference tables 173, and other data structures. In addition, an operating system 413 may be stored in the memory 406 and executable by the processor 403.

It is understood that there may be other applications that are stored in the memory 406 and are executable by the processors 403 as can be appreciated. Where any component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages.

A number of software components are stored in the memory 406 and are executable by the processor 403. In this respect, the term "executable" means a program file that is in a form that can ultimately be run by the processor 403. Examples of executable programs may be, for example, a compiled program that can be translated into machine code in a format that can be loaded into a random access portion of the memory 406 and run by the processor 403, source code that may be expressed in proper format such as object code that is capable of being loaded into a random access portion of the memory 406 and executed by the processor 403, or source code that may be interpreted by another executable program to generate instructions in a random access portion of the memory 406 to be executed by the processor 403, etc. An executable program may be stored in any portion or component of the memory 406 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 406 is defined herein as including both volatile and nonvolatile memory and data storage components. Volatile components are those that do not retain data values upon loss of power. Nonvolatile components are those that retain data upon a loss of power. Thus, the memory 406 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 403 may represent multiple processors and the memory 406 may represent multiple memories that operate in parallel processing circuits, respectively. In such a case, the local interface 409 may be an appropriate network that facilitates communication between any two of the multiple processors, between any processor and any of the memories, or between any two of the memories, etc. The local interface 409 may comprise additional systems designed to coordinate this communication, including, for example, performing load balancing. The processor 403 may be of electrical or of some other available construction.

Although the market analysis system 119 including the record linking application 123, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowchart of FIGS. 3A and 3B shows the functionality and operation of an implementation of portions of the record linking application 123. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 403 in a computer system or other system. The machine code may be converted from the source code, etc. If embodied in hardware, each block may represent a circuit or a number of interconnected circuits to implement the specified logical function(s).

Although the flowchart of FIGS. 3A and 3B shows a specific order of execution, it is understood that the order of execution may differ from that which is depicted. For example, the order of execution of two or more blocks may be scrambled relative to the order shown. Also, two or more blocks shown in succession in FIGS. 3A and 3B may be executed concurrently or with partial concurrence. Further, in some embodiments, one or more of the blocks shown in FIGS. 3A and 3B may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the record linking application 123, that comprises software or code can be embodied in any non-transitory computer-readable medium for use by or in connection with an instruction execution system such as, for example, a processor 403 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:
   at least one computing device;
   a plurality of identity records stored in a memory, each of the identity records comprising at least one attribute, and the identity records originating from a plurality of domains; and
   an application executable in the at least one computing device, the application comprising:
      logic that determines whether a set of attributes of a first one of the identity records meets at least one attribute standard, the at least one attribute standard defining a plurality of optional attributes and a minimum quantity of the optional attributes that are required to be present in the set of attributes;
      logic that determines whether the first one of the identity records is associated with a consumption entity in response to determining that the set of attributes meets the at least one attribute standard, wherein a second one of the identity records is associated with the consumption entity, and wherein the first and the second ones of the identity records originate from separate ones of the domains; and
      logic that associates the first one of the identity records with a persistent key if the first one of the identity records is determined to be associated with the consumption entity, where the persistent key is associated with the consumption entity;
      wherein the minimum quantity of the plurality of optional attributes is at least one, but less than a total number of the plurality of optional attributes;
      wherein the logic that determines whether the first one of the identity records is associated with the consumption entity further comprises logic that identifies at least one attribute match between the first and second ones of the identity records;
      wherein the logic that determines whether the first one of the identity records is associated with the consumption entity further comprises logic that generates a score for the at least one attribute match, the score indicating a degree of reliability of the at least one attribute match, the score being based on a plurality of sub-scores for the plurality of optional attributes, respectively; and
      wherein logic that determines whether the first one of the identity records is associated with the consumption entity further comprises logic that implements a tie breaker process between the first one of the identity records and the second one of the identity records by merging the first and second ones of the identity records based on scores associated with the first and second ones of the identity records, respectively.

2. The system of claim 1, wherein the first one of the identity records is determined to be associated with the consumption entity if the score is greater than a predefined match threshold.

3. The system of claim 1, wherein the second one of the identity records was associated with the persistent key prior to implementing the logic that determines whether the first one of the identity records is associated with the consumption entity.

4. The system of claim 1, wherein the application further comprises:
   logic that generates the persistent key if neither of the first and second ones of the identity records is associated with a previously existing persistent key, and the first one of the identity records is determined to be associated with the consumption entity; and logic that associates the second one of the identity records with the persistent key.

5. The system of claim 1, wherein a commercial activity of the consumption entity is associated with the first and second identity records.

6. The system of claim 1, wherein the logic that determines whether a set of attributes of a first one of the identity records meets at least one attribute standard further comprises:
   logic that determines whether the first one of the identity records meets a first attribute standard; and
   logic that determines whether the first one of the identity records meets a second attribute standard if the first one of the identity records does not meet the first attribute standard, where the first and second attribute standards each specify a set of attributes required to be present, and the first attribute standard is more restrictive than the second attribute standard.

7. The system of claim 6, wherein the first attribute standard specifies a plurality of mandatory attributes.

8. The system of claim 6, wherein the second attribute standard specifies at least one mandatory attribute.

9. The system of claim 1, wherein the consumption entity is one of a plurality of consumption entities, and the application further comprises logic that determines whether a persistent key is to be generated for the first one of the identity records when no association between any one of the consumption entities and the first one of the records can be identified.

10. The system of claim 9, wherein the logic that determines whether the persistent key is to be generated for the first one of the identity records further comprises:
    logic that generates the persistent key if the set of attributes of the first one of the identity records meets the at least one attribute standard.

11. The system of claim 1, wherein the application further comprises:
    logic that generates data encoding a user interface that facilitates specification of the at least one attribute standard, the user interface including a corresponding component for designating each of a set of attribute types as being mandatory and a corresponding component for designating each of the set of attribute types as being optional;
    logic that sends the data encoding the user interface to a client; and
    logic that obtains the specification of the at least one attribute standard from the client.

12. The system of claim 11, wherein the user interface includes a component for specifying the minimum quantity of the optional attributes.

13. The system of claim 11, wherein the client is associated with one of the domains, the one of the domains originating the first one of the identity records.

14. A method, comprising:
    storing a plurality of identity records in a memory accessible to a computing system, each of the identity records comprising at least one attribute, and the identity records originating from a plurality of domains;
    determining, in the computing system, whether a set of attributes of a first one of the identity records meets at least one attribute standard, the at least one attribute standard defining a plurality of optional attributes and a minimum quantity of the optional attributes that are required to be present in the set of attributes;
    responsive to determining that the set of attributes meets the at least one attribute standard, determining, in the computing system, whether the first one of the identity records identifies a consumption entity that is identified by a second one of the identity records, and wherein the first and the second ones of the identity records originate from separate ones of the domains, wherein the second one of the identity records is associated with a persistent key, the persistent key being associated with the consumption entity; and
    associating, in the computer system, the first one of the identity records with the persistent key if the first one of the identity records is determined to identify the consumption entity;
    wherein the minimum quantity of the plurality of optional attributes is at least one, but less than a total number of the plurality of optional attributes;
    wherein determining, in the computing system, whether the first one of the identity records identifies the consumption entity that is identified by the second one of the identity records further comprises identifying at least one attribute match between the first and second ones of the identity records;
    wherein determining, in the computing system, whether the first one of the identity records identifies the consumption entity that is identified by the second one of the identity records further comprises generating a score indicating a degree of reliability of the at least one attribute match, the score being based on a plurality of sub-scores for the plurality of optional attributes, respectively; and
    wherein determining, in the computer system, whether the first one of the identity records is associated with the consumption entity further comprises implementing a tie breaker process between the first one of the identity records and the second one of the identity records by merging the first and second ones of the identity records based on scores associated with the first and second ones of the identity records, respectively.

15. The method of claim 14, wherein the first one of the identity records is determined to identify the consumption entity that is identified by the second one of the identity records if the score is greater than a predefined match threshold.

16. A system, comprising:
    a plurality of identity records stored in a memory, each of the identity records comprising at least one attribute, and the identity records originating from a plurality of domains;
    means for determining whether a set of attributes of a first one of the identity records meets at least one attribute standard, the at least one attribute standard defining a plurality of optional attributes and a minimum quantity of the optional attributes that are required to be present in the set of attributes;
    means for determining whether the first one of the identity records identifies a consumption entity that is identified by a second one of the identity records responsive to determining that the set of attributes meets the at least one attribute standard, wherein the first and the second ones of the identity records originate from separate ones of the domains; and
    means for associating the first one of the identity records with a persistent key if the first one of the identity records is determined to identify the consumption entity, wherein the second one of the identity records is associated with the persistent key, and the persistent key being associated with the consumption entity;

wherein the minimum quantity of the plurality of optional attributes is at least one, but less than a total number of the plurality of optional attributes;

wherein the means for determining whether the first one of the identity records is associated with the consumption entity further comprises means for identifying at least one attribute match between the first and second ones of the identity records;

wherein the means for determining whether the first one of the identity records is associated with the consumption entity further comprises means for generating a score for the at least one attribute match, the score indicating a degree of reliability of the at least one attribute match, the score being based on a plurality of sub-scores for the plurality of optional attributes, respectively; and wherein the means for determining whether the first one of the identity records is associated with the consumption entity further comprises means for implementing a tie breaker process between the first one of the identity and the second one of the identity records by merging the first and second ones of the identity records based on scores associated with the first and second ones of the identity records, respectively.

* * * * *

UNITED STATES PATENT AND TRADEMARK OFFICE
CERTIFICATE OF CORRECTION

| | | |
|---|---|---|
| PATENT NO. | : 8,996,548 B2 | Page 1 of 1 |
| APPLICATION NO. | : 13/009666 | |
| DATED | : March 31, 2015 | |
| INVENTOR(S) | : Ronnie J. Garmon and Jim J. Deffenbaugh | |

It is certified that error appears in the above-identified patent and that said Letters Patent is hereby corrected as shown below:

In the Claims

Column 17, Line 19,    Delete: "identity and"
Claim 16               Insert: --identity records and--

Signed and Sealed this
Fifteenth Day of September, 2015

Michelle K. Lee
*Director of the United States Patent and Trademark Office*